Sept. 20, 1966 D. H. LIEN 3,274,481

FREQUENCY MULTIPLIER CIRCUIT

Filed May 2, 1962 2 Sheets-Sheet 1

INVENTOR
D. H. LIEN
BY J. J. Landis
ATTORNEY

INVENTOR
D. H. LIEN
BY J. J. Landis
ATTORNEY

United States Patent Office 3,274,481

Patented Sept. 20, 1966

3,274,481

FREQUENCY MULTIPLIER CIRCUIT

Dallas H. Lien, Indianapolis, Ind., assignor to Western Electric Company, Incorporated, New York, N.Y., a corporation of New York Filed May 2, 1962, Ser. No. 191,912
5 Claims. (Cl. 321—68)

This invention relates to frequency multiplier circuits, and more specifically to circuits for providing a composite output signal which has a frequency that is a multiple of the frequency of an input signal. Accordingly, objects of this invention are to provide new and improved circuits of such character.

Another object of this invention is to provide a circuit responsive to an alternating input signal for driving succeeding ones of a plurality of saturable cores from primary saturated states to nonsaturated states and back to primary saturated states before the next succeeding saturable core is driven through the same cycle of operation and for sequentially driving all the saturable cores through the same cycle of operation during each cycle of the input signal so that a composite alternating output signal is induced in an output conductor associated with the saturable cores which has a frequency equal to the frequency of the input signal times the number of saturable cores.

With these and other objects in mind, the present invention relates to a circuit for providing an output signal which has a frequency that is a multiple of the frequency of an alternating input signal. A series of saturable cores are provided and an output conductor is associated therewith. A control circuit, also associated with the saturable cores, is responsive to the input signal for causing succeeding ones of the saturable cores to be driven from primary saturated states to nonsaturated states and back to the primary saturated states before the next succeeding saturable core is driven through the same cycle of operation and for causing all the saturable cores to be sequentially driven through the same cycle of operation during each cycle of the input signal so that a composite alternating output signal is induced in the output conductor which has a frequency equal to the frequency of the input signal times the number of saturable cores.

This invention, together with other objects, advantages, and aspects thereof, will become apparent by reference to the following detailed description thereof and the accompanying drawings illustrating the preferred embodiment thereof, in which.

Figures 1, 2:
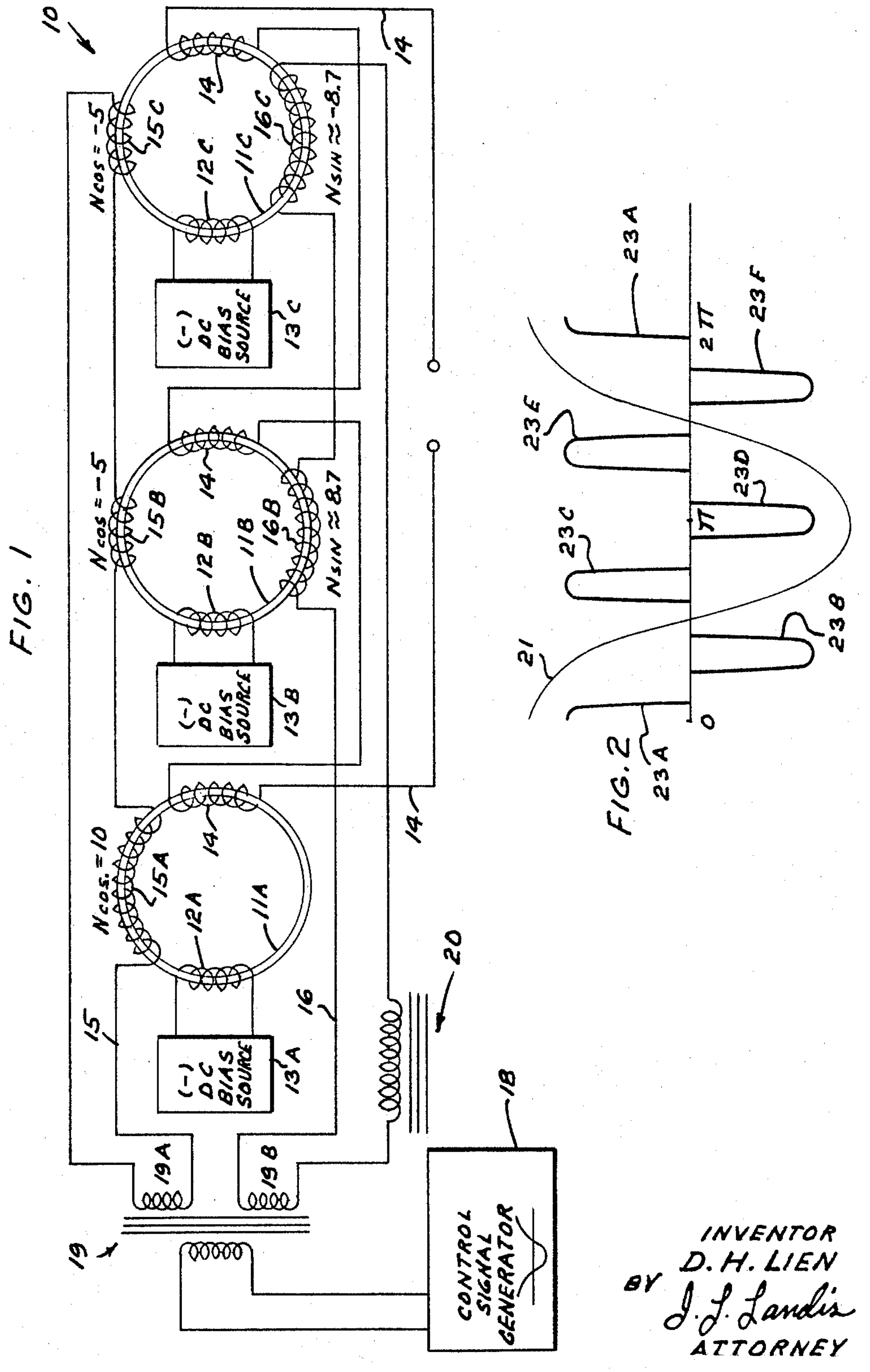
FIG. 1 is an enlarged view of a simplified frequency multiplier circuit illustrating a preferred embodiment of the invention.
FIG. 2 illustrates the relationship between an alternating input signal and an alternating output signal for the frequency multiplier circuit illustrated in FIG. 1.

Referring now in detail to the drawings and more specifically to FIG. 1, a simplified form of a frequency multiplier circuit 10 is illustrated in accordance with the preferred embodiment of the invention.

The frequency multiplier circuit 10 includes a series of saturable magnetic cores 11A–11C which are composed of a material having a well defined saturation in its hysteresis loop, such as magnetic iron, 45-Permalloy, magnesium-manganese ferrite and copper-manganese ferrite, so that the flux change induced therein for a given change in magnetizing force is substantially greater in the unsaturated region of the hysteresis loop than in the saturated region thereof. The frequency multiplier circuit 10 is designed to provide a composite alternating output signal which has a frequency that is equal to the frequency of an alternating input signal times the number of saturable cores used, and the illustrated frequency multiplier is a frequency tripler.

An output conductor 14 is wound on the saturable cores 11A–11C so as to be electromagentically associated therewith and, when a saturable core is driven from one state of magnetization to another state of magnetization, an output signal is induced therein. A composite alternating output signal having a frequency equal to the frequency of an alternating input signal times the number of saturable cores may be provided by driving each succeeding one of the saturable cores 11A–11C from a primary saturated state to a nonsaturated state and back to the primary saturated state before the next succeeding saturable core is driven through the same cycle of operation and by sequentially driving all the saturable cores through the same cycle of operation during each cycle of the input signal.

Each of the saturable cores 11A–11C has a bias winding 12A–12C wound thereon so as to be electromagnetically associated therewith, and D.C. sources 13A–13C are connected to the bias windings 12A–12C to apply negative D.C. signals, having equal amplitudes, thereto so that negative magnetizing forces are applied to the saturable cores 11A–11C which normally bias the saturable cores beyond negative magnetic saturation (primary saturated state). The amplitudes of the negative D.C. signals are so selected that the negative magnetizing forces induced thereby are greater in amplitudes than the negative magnetizing forces required to drive the saturable cores 11A–11C from selected nonsaturated states to the primary saturated states. Preferably, the saturable cores 11A–11C are biased with negative magnetizing forces which are greater in amplitude than the coercive forces of the saturable cores so that, if the saturable cores are driven from the primary saturated states to secondary saturated states (positive saturation), the biases have sufficient amplitudes to overcome the coercive forces and return the saturable cores to the primary saturated states.

A pair of control windings 15 and 16 are wound on the saturable cores 11A–11C so as to be electromagnetically associated therewith, and each control winding has periodic characteristic variations in the winding patterns which are distinct from but bear a predetermined relationship to the periodic characteristic variations of the other control winding so that a different combination of control winding patterns is established on each of the saturable cores. A control signal generator 18 is connected to the control windings 15 and 16 through a transformer 19 and provides input signals for the control windings 15 and 16 which sequentially induce maximum magnetizing forces adjacent succeeding ones of the saturable cores 11A–11C that overcome the effects of the negative bias and sequentially drive succeeding ones of the saturable cores 11A–11C from the primary saturated states to selected nonsaturated states.

The first control winding 15 is wound on the saturable cores 11A–11C in a cosinusoidal winding pattern so that the number of turns $N_{cos}$ and the winding directions associated with each each saturable core are determined by the following equation:

$$N_{cos}=N_{max}\cos[2\pi(x-1)/M]=10\cos[2\pi(x-1)/3]$$

wherein $N_{max}$ is an arbitrary constant designated as the maximum possible number of control winding turns (selected as 10 in the illustrated embodiment), $x$ is the number of the particular saturable core (the saturable cores 11A–11C being sequentially numbered from 1 to 3), and M is the total number of saturable cores (3 in the illustrated embodiment). Therefore, the number of turns of the cosine control winding 15 wound on the saturable core 11A (wherein $x=1$) is ten turns in the first hand or positive direction, since $N_{cos}=10 \cos 0\pi=10 \cos 0°$ and the cosine of 0° is 1. The number of turns of the cosine control winding 15 wound on the saturable core 11B (wherein $x=2$) is five turns in the second hand or negative direction, since $N_{cos}=10 \cos 2\pi/3=10 \cos 120°$ and the cosine of 120° is −.5. The number of turns of the cosine control winding 15 wound on the saturable core 11C (wherein $x=3$) is five turns in the second hand or negative direction, since $N_{cos}=10 \cos 4\pi/3=10 \cos 240°$ and the cosine of 240° is −.5.

The second control winding 16 is wound on the saturable cores 11A–11C in a sinusoidal winding pattern so that the number of turns $N_{sin}$ and the winding directions associated with each saturable core are determined by the following equation:

$$N_{sin}=N_{max} \sin [2\pi(x-1)/M]=10 \sin [2\pi(x-1)/3]$$

Therefore, the number of turns of the sine control winding 16 wound on the saturable core 11A is zero turns, since $N_{sin}=10 \sin 0\pi=10 \sin 0°$ and the sine of 0° is 0. The number of turns of the sine control winding 16 wound on the saturable core 11B is approximately 8.7 turns in the first hand or positive direction, since $N_{sin}=10 \sin 2\pi/3=10 \sin 120°$ and the sine of 120° is .866. The number of turns of the sine control winding 16 wound on the saturable core 11C is approximately 8.7 turns in the second hand or negative direction, since $N_{sin}=10 \sin 4\pi/3=10 \sin 240°$ and the sine of 240° is −.866.

The control signal generator 18 supplies a cosinusoidally varying input control signal 21, illustrated in FIG. 2, to the primary of the transformer 19 which varies according to the following equation:

$$I_{cos}=I_{max} \cos 2\pi ft$$

wherein $I_{max}$ is an arbitrary constant designated as the maximum value or amplitude of the input control signal (selected as 1 in the illustrated embodiment), $f$ is the frequency of the control signal, and $t$ is time.

Each of the control windings 15 and 16 is connected to one-half of the secondary of the transformer 19 and the ratio of the transformer 19 is preselected so that the input signal induced in each half 19A and 19B of the secondary of the transformer by applying the input control signal 21 to the primary of the transformer is the same as the input control signal 21 applied to the primary and is therefore also defined by the equation $$I_{cos}=I_{max} \cos 2\pi ft=\cos 2\pi ft$$

The input signal induced in the first half of the transformer secondary 19A which is connected to the first control winding 15 is applied directly to the control winding 15. The input signal induced in the second half of the transformer secondary 19B which is connected to the second control winding 16 is applied to the control winding 16 through an inductive phase shift choke 20 which shifts the phase of the input signal one-quarter wave length (90°) so that the input signal applied to the second control winding 16 is defined by the equation $$I_{sin}=I_{max} \sin 2\pi ft=\sin 2\pi ft$$

The magnetizing force supplied to a saturable core by applying the cosine input signal to the cosine control winding 15 is determined by the equation $$H_{cos}=I_{cos} N_{cos}=[I_{max} \cos 2\pi ft]\ [N_{max} \cos 2\pi(x-1)/M]$$
$$=[\cos 2\pi ft][10 \cos 2\pi(x-1)/3]=N_{cos} (\cos 2\pi ft)$$

and the magnetizing force applied to a saturable core by applying the sine input signal to the sine control winding 16 is determined by the equation $$H_{sin}=I_{sin} N_{sin}=[I_{max} \sin 2\pi ft]\ [N_{max} \sin 2\pi(x-1)/M]$$
$$=[\sin 2\pi ft]\ [10 \sin 2\pi(x-1)/3]=N_{sin} (\sin 2\pi ft)$$

Therefore, the total magnetizing force applied to a saturable core at any given time is determined by the equation $$H_{total}=H_{sin}+H_{cos}=[\sin 2\pi ft][10 \sin 2\pi(x-1/3]$$
$$+[\cos 2\pi ft][10 \cos 2\pi(x-1)/3]$$

and this equation may be solved by the trigonometric identity $$\cos (a-b)=(\cos a)\ (\cos b)+(\sin a)\ (\sin b)$$

so that $$H_{total}=10 \cos [2\pi ft-2\pi(x-1)/3]$$

The above total magnetizing force equation illustrates that the total magnetizing force is a maximum when $[2\pi ft]$ and $[2\pi(x-1)/M]$ are equal, since cos 0 is a maximum. Since time moves forward at a constant rate, the maximum magnetizing force sequentially shifts from one saturable core to the next succeeding saturable core at a constant rate during each cycle of the input control signal 21. The maximum amplitude of the input control signal 21 is so selected that the maximum cumulative magnetizing forces caused to be induced thereby have sufficient amplitudes to overcome the effects of the negative D.C. biases and sequentially drive succeeding ones of the saturable cores 11A–11C from the primary saturated states to the selected nonsaturated states. In the illustrated example, the maximum cumulative magnetizing forces induced by applying the input signals to the two control windings are equal to 10 and the mathematical solutions for the sequential inducement thereof adjacent succeeding ones of the saturable cores 11A–11C are set forth below.

When $2\pi ft=0\pi$ or 0°: the magnetizing force applied to the saturable core 11A has a maximum positive value since $H_{cos}=N_{cos}\ (\cos 2\pi ft)=10 \cos 0°=(10)\ (1)=10$ and $H_{sin}=N_{sin}\ (\sin 2\pi ft)=0 \sin 0°=0$ so that $H_{total}\ H_{cos}+H_{sin}=10+0=10$. When $2\pi ft=2\pi/3$ or 120°: the magnetizing force applied to the saturable core 11B has a maximum positive value since $H_{cos}=N_{cos} \cos (2\pi ft)=-5 \cos 120°=(-5)\ (-0.5)=2.5$ and $H_{sin}=N_{sin} \sin (2\pi ft)=8.7 \sin 120°=(8.7)\ (.866)=7.5$ so that $H_{total}=H_{cos}+H_{sin}=2.5+7.5=10$. When $2\pi ft=4\pi/3$ or 240°: the magnetizing force applied to the saturable core 11C has a maximum positive value since $H_{cos}=N_{cos}\ (\cos 2\pi ft)=-5 \cos 240°=(-5)\ (-0.5)=2.5$ and $H_{sin}=N_{sin}\ (\sin 2\pi ft)=-8.7 \sin 240°=(-8.7)\ (-.866)=7.5$ so that $$H_{total}=H_{cos}+H_{sin}=2.5+7.5=10$$

Thus (1), when $2\pi ft=0°$, the saturable core 11A is driven from the primary saturated state to the selected nonsaturated state, (2), when $2\pi ft=120°$, the saturable core 11B is driven from the primary saturated state to the selected nonsaturated state, and (3), when $2\pi ft=240°$, the saturable core 11C is driven from the primary saturated state to the selected nonsaturated state, so that positive output signals 23A, 23C, and 23E (see FIG. 2) are induced in the output conductor 14.

In the illustrated embodiment, the amplitudes of the negative D.C. biases are so selected that (1), when $2\pi ft=60°$, the negative magnetizing force induced adjacent the saturable core 11A by the negative D.C. bias 13A has sufficient amplitude to overcome the effect of the positive magnetizing force induced adjacent the memory device 11A by the input signals and drive the saturable core 11A from the selected nonsaturated state to the primary saturated state, (2), when $2\pi ft=180°$, the negative magnetizing force induced adjacent the saturable core 11B by the negative D.C. bias 13B has sufficient amplitude to overcome the effect of the positive magnetizing force induced adjacent the saturable core 11B by the input signals and drive the saturable core 11B from the selected nonsaturated state to the primary saturated state, and (3) when $2\pi ft=300°$, the negative magnetizing force induced adjacent the saturable core 11C by the negative D.C. bias 13C has sufficient amplitude to overcome the effect of the positive magnetizing force induced adjacent the saturable core 11C by the input signals and drive the saturable core 11C from the selected nonsaturated state to the primary saturated state, so that negative output signals 23B, 23D, and 23F (see FIG. 2) are induced in the output conductor 14.

Therefore, as illustrated in FIG. 2, during each 360° cycle of the input control signal 21, each of the saturable cores 11A–11C is driven from the primary saturated state to the selected nonsaturated state and back to the primary saturated state before the next succeeding saturable core is driven through the same cycle of operation and all the saturable cores are sequentially driven through the same cycle of operation so that a composite output signal, consisting of the independently induced output signals 23A–23F, is provided which has a frequency that is equal to the frequency of the input control signal times the number of saturable cores used.

Figure 3:
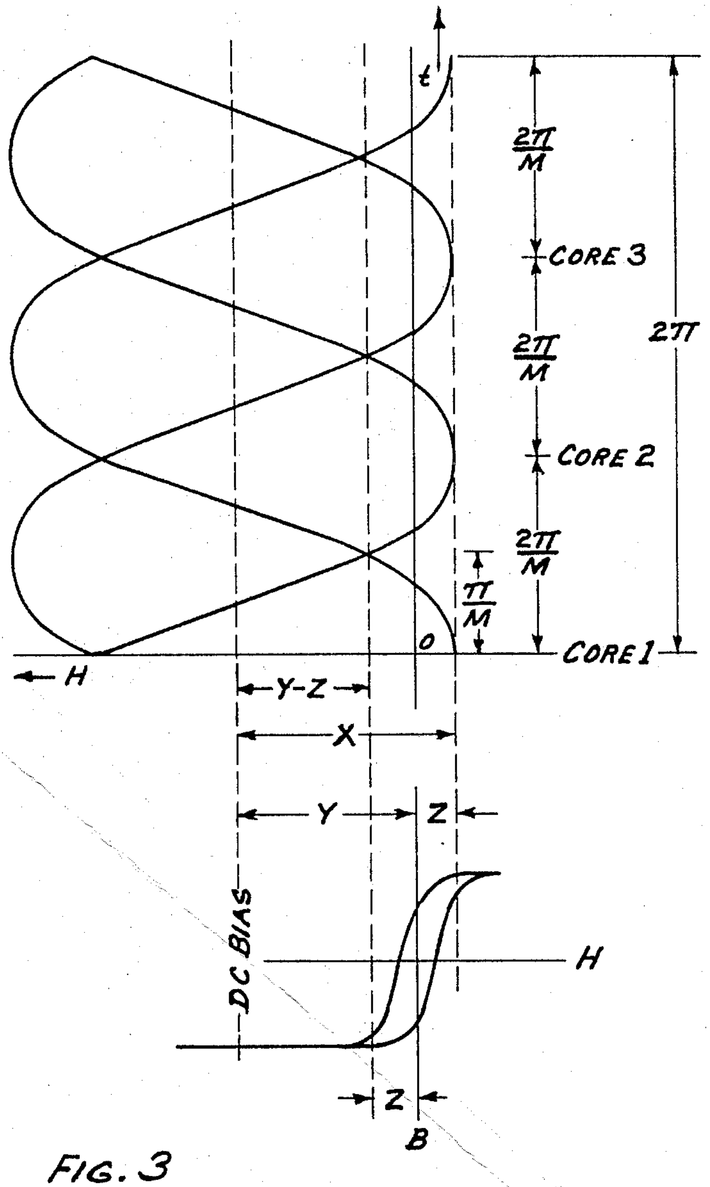
FIG. 3 illustrates the relationship between magnetizing forces induced adjacent magnetic cores of the frequency multiplier circuit illustrated in FIG. 1 and the hysteresis loops of the magnetic cores.

Referring to FIG. 3, when a saturable core is driven from the primary saturated state to the selected nonsaturated state as set forth above, the relationships of the induced magnetizing forces are defined by the equation $$X=Y+Z$$

wherein X is the maximum amplitude of the magnetizing force induced by the input signals, Y is the amplitude of the magnetizing force induced by the D.C. bias, and Z is the amplitude of the magnetizing force required to drive the saturable core to saturation as illustrated in FIG. 3. When a saturable core is driven from the selected nonsaturated state to the primary saturated state as set forth above, the relationships of the induced magnetizing forces are defined by the equation $$X \cos \pi/M=Y-Z$$

wherein $X \cos \pi/M$ is the amplitude of the magnetizing force induced by the input signals and M is the number of saturable cores. These equations may be solved simultaneously to determine the values of $X=f(Z)$ and $Y=f(Z)$.

Subtracting the second equation from the first equation as follows provides $X=f(Z)$:

$$\begin{array}{r} X=Y+Z \\ X\cos \pi/M=Y-Z \\ \hline X-X\cos \pi/M=2Z \\ X(1-\cos \pi/M)=2Z \end{array}$$

and from the trigonometric identity $$\sin a/2=\sqrt{\frac{1-\cos a}{2}}$$

$$\sqrt{X}=\frac{\sqrt{Z}}{\sin \pi/2M}$$

$$X=\frac{Z}{\sin^2 (\pi/2M)}=Z \sec.^2 (\pi/2M)$$

Substituting the first equation for X into the second equation as follows provides $Y=f(Z)$:

$$(Y+Z)\cos \pi M=Y-Z$$
$$Y\cos \pi/M+Z\cos \pi/M=Y-Z$$
$$Y\cos \pi/M-Y=-Z\cos \pi/M-Z$$
$$Y(\cos \pi/M-1)=-Z(\cos \pi/M+1)$$

$$Y=\frac{Z(1+\cos \pi/M)}{(1-\cos \pi/M)}$$

and from the trigonometric identity $$\cot a/2=\sqrt{\frac{1+\cos a}{1-\cos a}}$$

$$\sqrt{Y}=\sqrt{Z}\cot \pi/2M$$
$$Y=Z\cot^2 (X/2M)$$

For the illustrated embodiment of a frequency tripler wherein $M=3$, $$X=\frac{Z}{\sin^2 (\pi/6)}=\frac{Z}{(1/2)^2}=4Z$$

$$Y=\frac{Z\cos^2 (\pi/6)}{\sin^2 (\pi/6)}=Z\frac{(\sqrt{3}/2)^2}{(1/2)^2}=3Z$$

Therefore, for the frequency multiplier circuit 10 to operate as set forth above, the amplitudes of the magnetizing forces induced by the D.C. biases must be equal to three-fourths of the amplitudes of the maximum magnetizing forces induced by the input signals and the amplitudes of the maximum magnetizing forces induced by the input signals must be equal to four times the saturation magnetizing force of the saturable cores.

The frequency multiplier circuit 10 illustrated in FIG. 1 is a frequency tripler. It should be noted, however, that an output signal which has a frequency that is any desired multiple of an input signal frequency may be provided by adding or subtracting saturable cores from the frequency multiplier circuit 10 of FIG. 1 and determining the number of turns and winding directions by the abovementioned equations since the resultant output frequency will be equal to the number of saturable cores times the frequency of the input signal.

While a specific embodiment of the invention has been described in detail, it will be obvious that various modifications may be made from the specific details described without departing from the spirit and scope of the invention.

What is claimed is:

1. A frequency multiplier circuit for providing a composite alternating output signal having a frequency that is a multiple of the frequency of an alternating input signal, which comprises:

a series of saturable magnetic devices;

biasing means for applying magnetizing force to the magnetic devices which bias the magnetic devices beyond a primary saturated state, the magnetizing forces applied to the magnetic devices by the biasing means having sufficient amplitudes and having the required polarities to drive the magnetic devices from selected nonsaturated states to the primary saturated states;

a pair of control windings wound about the magnetic devices so as to be electromagnetically associated therewith and connected to the source of the input signal so that magnetizing forces are applied to the magnetic devices in response to the application of the input signal thereto, each control winding having periodic characteristic variations in the winding pattern which are distinct from but bear a predetermined relationship to the periodic characteristic variations in the winding pattern of the other control winding so that a different combination of control winding patterns is established on each magnetic device;

means associated with one of the control windings for shifting the phase of the input signal from the source one-quarter wave length so that the resultant signals applied to the two control windings are one-quarter wave length out of phase with respect to each other, maximum magnetizing forces being sequentially applied to succeeding ones of the magnetic devices during each cycle of the input signal in response to the application of the input signal to the control windings, the maximum magnetizing forces having sufficient amplitudes and having the required polarities to overcome the effects of the biasing means and drive the magnetic devices from the primary saturated states to selected nonsaturated states, each magnetic device being driven from the selected nonsaturated state to the primary saturated state by the biasing means subsequent to being driven from the primary saturated state to the selected nonsaturated state and each magnetic device being driven from the primary saturated state to the selected nonsaturated state and back to the primary saturated state before the next succeeding magnetic device is driven through the same cycle of operation; and an output conductor so wound on the magnetic devices that an output signal is induced therein when a magnetic device is driven from one state of magnetization to another state of magnetization whereby a composite alternating output signal is induced in the output conductor during each cycle of the input signal which has a frequency equal to the input signal frequency times the number of magnetic devices, the output signal induced in the output conductor when a magnetic device is driven from the primary saturated state to the selected nonsaturated state being opposite in polarity to the output signal induced therein when a magnetic device is driven from the selected nonsaturated state to the primary saturated state.

2. The frequency multiplier circuit as recited in claim 1, wherein:

the primary saturated state of each magnetic device is a state of negative magnetic saturation so that a positive magnetizing force is required to drive a magnetic device from the primary saturated state to the selected nonsaturated state and a negative magnetizing force is required to drive a magnetic device from the selected nonsaturated state to the primary saturated state;

the biasing means applies negative magnetizing forces to the magnetic devices which bias the magnetic devices beyond negative magnetic saturation;

maximum positive magnetizing forces being sequentially applied to succeeding ones of the magnetic devices in response to the application of the input signal to the control windings;

the number of turns and the winding directions of a first control winding associated with each magnetic device are determined by the equation $$N_{\cos}=N_{\max}\cos\,[2\pi(x-1)/M]$$

wherein $N_{\max}$ is an arbitrary constant designated as the maximum number of control winding turns, $x$ is the number of the particular magnetic device, and M is the total number of magnetic devices;

the number of turns and the winding directions of the second control winding associated with each magnetic device are determined by the equation $$N_{\sin}=N_{\max}\sin\,[2\pi(x-1)/M]$$

the input signal supplied by the source and applied to the first control winding is defined by the equation $$I_{\cos}=I_{\max}\cos\,(2\pi ft)$$

wherein $I_{\max}$ is an arbitrary constant designated as the maximum value of the input signal, $f$ is the frequency of the input signal, and $t$ is time; and the phase shifting means is an inductive choke which shifts the phase of the input signal supplied by the source one-quarter wave length so that the input signal applied to the second control winding is defined by the equation $$I_{\sin}=I_{\max}\sin\,(2\pi ft)$$

3. A frequency multiplier circuit for providing a composite alternating output signal having a frequency that is a multiple of the frequency of an alternating input signal, which comprises:

a series of magnetic devices;

a bias winding on each of said devices;

means for applying a D.C. voltage to each of said bias windings to bias the associated magnetic device beyond a primary state of saturation;

a first primary winding on each of said devices;

means for applying a first A.C. voltage of the same frequency as the input signal to each of said first input windings;

a second primary winding on each of said devices;

means for applying a second A.C. voltage of the same frequency as the first A.C. voltage and of substantially phase displaced relationship with respect thereto to said second primary windings;

said first and second primary windings having different turn ratios for the various ones of said devices whereby the resultant peak magnetizing force of the two A.C. voltages in the various ones of said magnetic devices are phase displaced with respect to each other; and a secondary winding on each of said magnetic devices, said secondary windings being interconnected such that output signals developed in the indiidual secondary windings are combined to form a composite output signal having a frequency equal to the alternating input signal frequency times the number of magnetic devices;

the magnetizing forces of the D.C. voltage and of the A.C. voltages acting through their respective windings being so related that successive ones of said magnetic devices are driven out of their primary states of saturation and back into their primary saturated states once during each cycle of the input signal, whereby each magnetic device, in turn, produces two consecutive wave halves of the composite output signal during a portion of each cycle of the input signal.

4. A frequency multiplier circuit as specified in claim 3, wherein the magnetizing force of the D.C. voltage acting through said bias windings is substantially equal within the various ones of said magnetic devices, and the resultant peak magnetizing force of the two A.C. voltages is substantially equal within the various ones of said magnetic devices.

5. A frequency multiplier circuit as specified in claim 3, wherein the magnetizing forces of the D.C. voltage and of the A.C. voltages acting through their respective windings are so related that successive ones of said magnetic devices are driven out of their primary saturated states through their unsaturated states into oppositely saturated states and back to their primary saturated states once during each cycle of the input signal, whereby each magnetic device, in turn, produces two consecutive but non-contiguous wave halves of the output signal during a portion of each cycle of the input signal.

References Cited by the Examiner

UNITED STATES PATENTS

| | | | |
|---|---|---|---|
| 1,215,820 | 2/1917 | Kujirai | 321—68 |
| 1,917,921 | 7/1933 | Burton | 321—68 |
| 2,580,446 | 1/1952 | Lovell et al. | 321—68 |
| 2,666,178 | 1/1954 | Kramer | 321—68 |
| 2,887,644 | 5/1959 | Ogle | 321—69 |

JOHN F. COUCH, *Primary Examiner.*

LLOYD McCOLLUM, *Examiner.*

G. J. BUDOCK, G. GOLDBERG, *Assistant Examiners.*